US007759599B2

(12) United States Patent
Hawley et al.

(10) Patent No.: US 7,759,599 B2
(45) Date of Patent: Jul. 20, 2010

(54) INTERCHANGEABLE PLASMA NOZZLE INTERFACE

(75) Inventors: David Hawley, Kings Park, NY (US); Ronald J. Molz, Mt. Kisco, NY (US)

(73) Assignee: Sulzer Metco (US), Inc., Westbury, NY (US)

( * ) Notice: Subject to any disclaimer, the term of this patent is extended or adjusted under 35 U.S.C. 154(b) by 841 days.

(21) Appl. No.: 11/392,650

(22) Filed: Mar. 30, 2006

(65) Prior Publication Data

US 2006/0289404 A1 Dec. 28, 2006

Related U.S. Application Data

(60) Provisional application No. 60/675,910, filed on Apr. 29, 2005.

(51) Int. Cl.
*B23K 10/00* (2006.01)

(52) U.S. Cl. ............................ 219/121.47; 219/121.48; 219/121.5; 219/75; 313/231.31

(58) Field of Classification Search .............. 219/121.5, 219/121.51, 121.52, 121.48, 121.47, 76.16, 219/76.15, 121.59; 313/231.31, 231.41; 315/111.21
See application file for complete search history.

(56) References Cited

U.S. PATENT DOCUMENTS 3,914,573 A * 10/1975 Muehlberger, Erich .. 219/76.16
4,389,559 A * 6/1983 Rotolico et al. .......... 219/121.5
4,688,722 A * 8/1987 Dellassio et al. .............. 239/81
4,861,962 A 8/1989 Sanders et al.
5,332,885 A 7/1994 Landes et al.
5,406,046 A * 4/1995 Landes .................. 219/121.47
5,695,662 A * 12/1997 Couch et al. ........... 219/121.39

OTHER PUBLICATIONS

International Search Report dated Sep. 8, 2006 for International Patent Application No. PCT/US2006/014962.

* cited by examiner

*Primary Examiner*—Mark H Paschall
(74) *Attorney, Agent, or Firm*—Greenblum & Bernstein, P.L.C.

(57) ABSTRACT

The present invention provides a standard interface for providing mechanical location, mechanical orientation, electrical connections, and water chamber seals for the exchange of a variety of plasma forming nozzles each associated with a specific plasma plume characteristic. The flexibility of the nozzle attachment is improved over prior designs by providing a standard exterior nozzle configuration and nozzle clamping assembly on the plasma gun so that multiple nozzles configurations (giving different plasma flow properties) can easily be used with the same devices. The joining of the nozzle to the receptacle forms a channel for cooling liquid to flow from the plasma gun through the nozzle to a return path in the plasma gun and creates an electrical contact between the plasma gun and the nozzle.

20 Claims, 3 Drawing Sheets

INTERCHANGEABLE PLASMA NOZZLE INTERFACE

CROSS REFERENCE TO RELATED APPLICATIONS

This application claims priority under 35 U.S.C. §119(e) from U.S. Provisional Patent Application No. 60/675,910, filed on Apr. 29, 2005, and which is incorporated herein by reference.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

1. Field of the Invention

The present invention relates generally to equipment for the thermal spraying of powdered materials. More specifically, the present invention relates to an interchangeable nozzle interface for use with a thermal spray plasma gun.

2. Description of Related Art

A variety of thermal spray coatings have been used to protect various types of components. Coatings may provide various benefits such as to resist wear, retard corrosion, control clearances, salvage worn components, resist high temperatures and/or enhance electrical properties. These benefits can differ based on the coating material type and how those materials are applied. One group of spray coatings to which the subject matter of the present invention pertains in particular are those applied via the plasma spray process. This process has been used to apply many different types of coatings in numerous industries.

Each material coating specification requires a specific range of velocity and temperature transferred to the powder particle to achieve the required material properties on the part. Improved consistency and efficiency in the delivery of thermal spray coatings remains an industry-wide goal.

The plasma gun has been used as a process tool in the spray coatings industry due to the wide range of parameters that are achievable with this basic tool. A key element of any plasma gun is the nozzle geometry. Variations in nozzle geometry can allow a plasma gun to provide coating properties at a different temperatures and velocities from the same base equipment. When operators would need to apply a different type of spray coating, they often must use a different nozzle. Thus a single plasma gun with interchangeable nozzles can serve multiple uses and, potentially provide significant equipment costs savings over guns with a fixed nozzle geometry. Generally, prior art spray gun and nozzle configurations were not typically designed with nozzle interchangeability in mind. Prior art configurations were such that the operator would also often need to change the spray gun itself.

However, there are a number of factors that can prove challenging in replacing the a plasma gun nozzle. Plasma spray guns must perform several different functions in order to achieve a successful coating process. Those functions include proper alignment of the spray nozzle as well as sealing of the channel through which plasma gases flow. Also, cooling of the gun nozzle during the spray process is required to prevent overheating. So proper flow of coolant sealing around the nozzle area and adequate sealing of the cooling path is essential. An electrical connection between the nozzle and the plasma gun is also required to serve as the return path for the plasma arc current flow. Precise orientation of mechanical location, electrical connections and water chamber seals must be achieved to obtain the desired spray characteristics.

A standard interface for each nozzle that would assure proper orientation of all plasma gun components with each interchangeable nozzle, while minimizing the risk of human error would be beneficial to the spray coating industry. Optimal orientation could extend the range of performance for a single thermal spray plasma gun. Thus, there remains a need in the art for a standard nozzle interface for a thermal spray plasma gun that provides an optimal, efficient and repeatable nozzle connection for a wide range of nozzle geometries.

SUMMARY OF THE INVENTION

The present invention meets the aforementioned need by providing a standard interface for providing mechanical location, mechanical orientation, electrical connections, and water chamber seals for the exchange of a variety of plasma forming nozzles each associated with a specific plasma plume characteristic. The flexibility of the nozzle attachment is improved over prior designs by providing a standard exterior nozzle configuration and nozzle clamping assembly on the plasma gun so that multiple nozzles configurations (giving different plasma flow properties) can easily be used with the same devices.

The interface serves as a common mechanical method of mating an interchangeable nozzle to a thermal spray plasma gun body. The nozzle may be located such that the mating bores of the gun body and nozzle carrying the plasma stream line up to form a continuously aligned chamber. In the assembled configuration, water flow may be carried from the gun body, through the nozzle, and back out to a return water flow channel. Also the interface provides sufficient capability to passing an electrical current of up to 800 amps at up to 300 volts between gun body and the nozzle. The actual power through the interface will vary depending upon the specific materials to be sprayed and the desired coating characteristics.

In one embodiment of the invention, an interface for a thermal spray plasma gun and an interchangeable nozzle plug is provided. The interface includes a receptacle on the plasma gun, the receptacle fabricated at least partially from an electrically conductive material and having a face section and a first cylindrical bore extending from within said plasma gun to the face section. The nozzle plug is fabricated from an electrically conductive material and has a mating end section, a distal end section, and a second cylindrical bore extending from the mating end section to the distal end section. The interface also includes a clamping assembly on the plasma gun for mechanically securing the mating end section to the face section. When joined the mating end section and the face section align the first cylindrical bore and the second cylindrical bore so as to form a continuous passage for plasma gas to flow from the first cylindrical bore through the second cylindrical bore, form a channel for cooling liquid to flow from the plasma gun through the nozzle plug and to a return path in the plasma gun, and create an electrical contact between the plasma gun and the nozzle plug.

Another embodiment provides an interchangeable nozzle for use with a plasma gun that has a nozzle plug receptacle with a face portion and a plasma outlet. The nozzle includes a nozzle plug fabricated from an electrically conductive material and has a mating end section, a distal end section, and a cylindrical bore extending from the mating end section to the distal end section. The nozzle plug is configured for forming an interface with the plasma gun wherein the mating end section and the face portion join to align the cylindrical bore and plasma outlet forming a continuous passage for plasma gas to flow from the plasma gun through the cylindrical bore. The joining of the mating end section and the face portion also forms a channel for cooling liquid to flow from the plasma gun through the nozzle and to a return path in the plasma gun and creates an electrical contact between the plasma gun and the nozzle.

In another embodiment, a method of forming an interface between a plasma gun and interchangeable nozzle is provided. The method includes the step of providing a plasma gun having a nozzle plug receptacle and a clamping assembly, the receptacle being fabricated at least partially from an electrically conductive material, the receptacle having a face section and a first cylindrical bore extending from within said plasma gun to said face section. Another step includes providing a nozzle plug fabricated from an electrically conductive material and having a mating end section, a distal end section, and a cylindrical bore extending from the mating end section to the distal end section. The method further includes securing the mating end section to the face portion with the clamping assembly, wherein the mating end section and the face portion join to align the cylindrical bore and plasma outlet forming a passage for plasma gas to flow, forming a channel for cooling liquid to flow from the plasma gun through the nozzle plug, and creating an electrical contact between the plasma gun and the nozzle plug.

Additional features of the invention will be set forth in the description which follows, and in part will be obvious from the description, or may be learned by practice of the invention. The features of the invention may be realized and obtained by means of the instrumentalities and combinations particularly pointed out hereinafter.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

Figure 1:
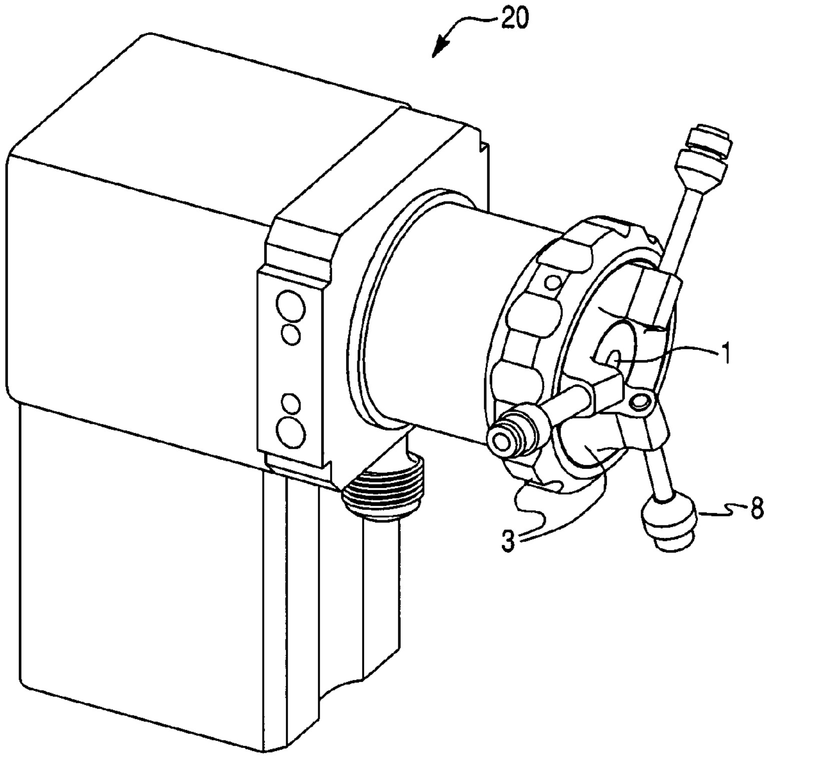
FIG. 1 provides a three-dimensional perspective of a plasma gun incorporating a nozzle interface in accordance with the present invention.

FIG. 1 provides a three-dimensional perspective of a plasma gun incorporating a nozzle interface in accordance with the present invention. Plasma gun 20 is an apparatus for spraying powdery material in a molten state, particularly for the coating of the surface of a work piece. Plasma gun 20 may be a cascaded, multiple-arc plasma gun or other plasma gun. The plasma is created by means of a torch internal to the gun 20 and guided through an internal plasma channel (shown as reference 11 in FIG. 2) to an outlet nozzle 1. The plasma gun 20 includes a receptacle assembly (reference 10, FIG. 5) to receive the nozzle 1. The nozzle 1 is secured to gun 20 at the receptacle assembly 10 by a clamping assembly 3, which will be described in greater detail with discussion of FIG. 2. The nozzle 1 is an interchangeable part and can be removed from the receptacle assembly 10 by releasing the clamping assembly 3.

In the embodiment shown in FIG. 1, the nozzle 1 terminates before the plasma stream reaches the powder injectors 8. However, the nozzle configuration could be altered, for example, so that the powder is injected into the plasma stream within the nozzle rather than into the plasma as it exits the nozzle. Any internal nozzle configuration can be used in nozzle 1 to give different spray properties so long as the nozzle surfaces (shown, e.g., in FIGS. 3 and 4A) that mate with the spray gun are compatible.

Figure 2:
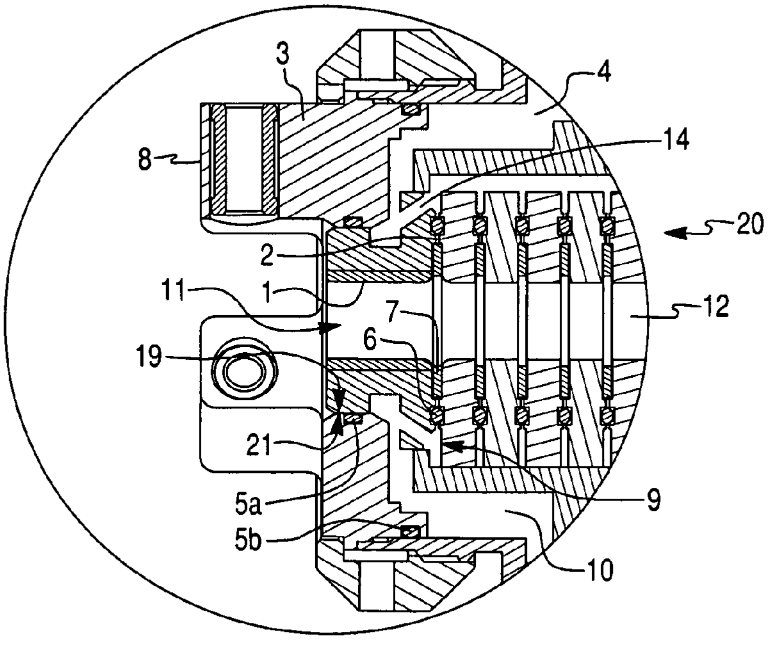
FIG. 2 is a drawing of a cross-sectional view of the joined nozzle interface in accordance with an embodiment of the invention.

FIG. 2 shows a cross-sectional view of the joined nozzle interface of the gun 20 in accordance with an embodiment of the invention. In the interface, the nozzle plug 1 is seated in the receptacle assembly 10 of gun 20. The interface includes multiple elements with a plurality of functions. These functions include providing a mechanical containment for the nozzle 1, providing an electrical connection, providing a cooling water (or other fluid) connection, and providing a plasma gas connection. These functions are addressed more specifically in relation to the joined mechanical interface in FIG. 2.

The electrical connection is made by the mating together of a surface 21 of the nozzle plug 1 and an aligned surface 19 of clamping assembly 3. A good electrical connection is important for operation of the plasma gun, serving as the return path for the current flow generating the plasma arc. Both the nozzle plug 1 at surface 21 and the clamping assembly 10 at surface 19 are fabricated from an electrically conductive material such as, but not limited to, copper.

The interface provides a channel 4 for water or other liquid cooling media to flow into and out of the nozzle plug 1. The water channel 4 flows from the gun 20 through holes 14 in the nozzle plug 1. The channel 4 encircles a portion of the plug 1 to allow cooling liquid to contact the exterior wall of the nozzle bore 11. Surface 2 of nozzle plug 1 and surface 9 of the receptacle assembly are held under compression by clamping assembly 3, which may be in the form of a two-piece compression nut. Although a compression nut is shown, other clamping assemblies such as latches, bolts, clamps, or a similar tensioning device could be used so long as the clamping assembly 3 is removable and supplies sufficient tension to compress a sealing o-ring 6 in the receptacle to prevent water leakage between the nozzle face 2 and the receptacle face 9.

The interface should be sealed to contain the water at pressures up to approximately 300 psig. The interface contains grooves on the clamping assembly 3 to serve as seats for two o-ring 5*a*, 5*b* (or equivalent) that seal the water channel.

Still referring to FIG. 2, the plasma connection is formed when the nozzle plug 1 is secured to the receptacle face 9 so that the bore 11 of the nozzle plug 1 is aligned with the plasma channel 12 of the gun 20. The plasma channel 12 and the nozzle bore 11, when joined together, form essentially a continuous path for plasma flow. The nozzle bore 11 and the plasma channel 12 should have about the same diameter at the interface, approximately 7-11 mm. A single o-ring 6 or equivalent face seal is included to serve as a water (or other cooling liquid) seal for water or other cooling fluid flowing in the water channel 4 (FIG. 2) through the holes 14. In addition, a replaceable high temperature gasket 7 is used to shield the seal 6 from the radiant and high temperature exposure from the plasma gas stream and ensure electrical isolation from the electrically neutral central gun bore 12 components.

Figure 3:
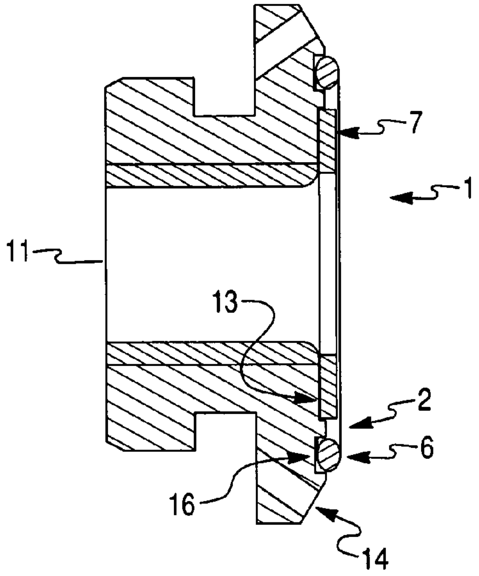
FIG. 3 is a drawing of a cross-sectional view of the nozzle plug interface in accordance with an embodiment of the invention.

Individual details of the nozzle plug 1 are shown in FIG. 3. The nozzle plug 1 has an outer plug face 2 diameter of 1.177 inches (29.90 mm). and a depth sufficient to mechanically center the nozzle within a plasma gun body. The outer plug face 2 is dimensioned to accommodate seals and structure necessary to allow plasma gas flow and adequate cooling flow through the interface. The nozzle face 2 contains an annular groove 16 to partially seat the o-ring 6 (or equivalent) to seal the water channel 4 (FIG. 2). The groove is 0.24 inches (0.6 mm) deep and has an inner diameter of 0.787 inches (20 mm) and an outer diameter of 0.945 inches (24.00 mm). As noted above with respect to FIG. 2, a high temperature ceramic gasket 7 is used as a component of the interface. The high temperature ceramic gasket 7 has an outer diameter of 0.709 inches (18.0 mm) and cross section width of 0.07 inches (1.8 mm) and sits between the bore 11 and the o-ring groove 16 on the nozzle face 2. The nozzle 1 includes counter bores 13 on the nozzle face 2 that are 0.012 inches (0.3 mm) deep and have a diameter of 0.712 inches (18.0 mm) that serves as a seat for the high temperature gasket 7 to protect the aforementioned seal 6 from exposure to the high temperatures associated with the plasma plume. The replaceable high temperature gasket 7 is used as a component of the interface with an outer diameter of 0.709 inches (18 mm) and a width of 0.035 inches (0.9 mm). The nozzle plug 1 has a bore hole of between about 0.275 to 0.433 inches (7-11 mm) in diameter at the center of the mating surface between the nozzle face 2 and the receptacle 9.

Figure 4A:
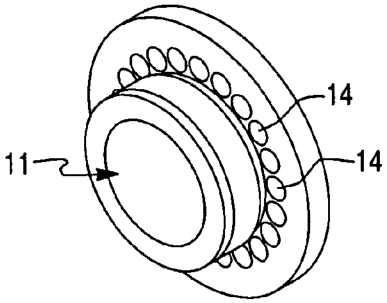
FIG. 4A provides a perspectives showing the exit end of a nozzle plug according to one embodiment of the present invention.
Figure 4B:
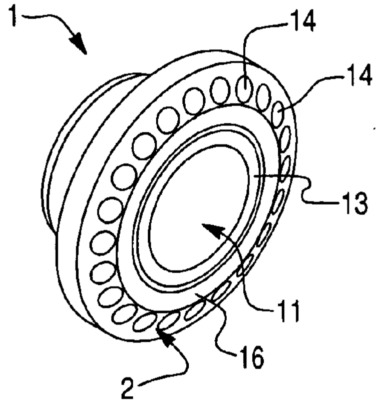
FIG. 4B provides a perspective view showing the mating end of a nozzle plug according to one embodiment of the present invention.
Figure 4C:
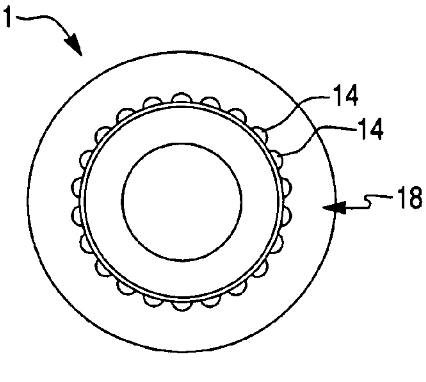
FIG. 4C provides a front view of a nozzle plug according to one embodiment of the present invention.
Figure 4D:
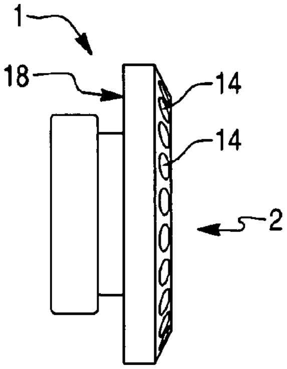
FIG. 4D provides a side view of a nozzle plug according to one embodiment of the present invention.

FIGS. 4A-4D provide various perspectives of the nozzle plug 1 according to one embodiment of the present invention. FIG. 4A provides a perspective view showing the distal (or exit) end of the nozzle 1. FIG. 4B provides a perspective view showing the mating end of the nozzle plug 1. FIG. 4C provides a front view of nozzle 1, and FIG. 4D provides a side view of nozzle 1. As can be seen in FIGS. 4A-4D holes 14 are include in nozzle face 2 and placed around the nozzle bore 11 to provide part of water channel 4 (FIG. 2). The nozzle face 2 contains an annular groove 16 and counter bores 13 as described above with respect to FIG. 3. When installed in the gun receptacle 10 (FIGS. 2, 5), the nozzle face 2 is joined to the receptacle face 9 (FIGS. 2, 5) and held in place by the compression force of clamping assembly 3 (FIG. 2) acting on surface 18 of the nozzle plug 1.

Figure 5:
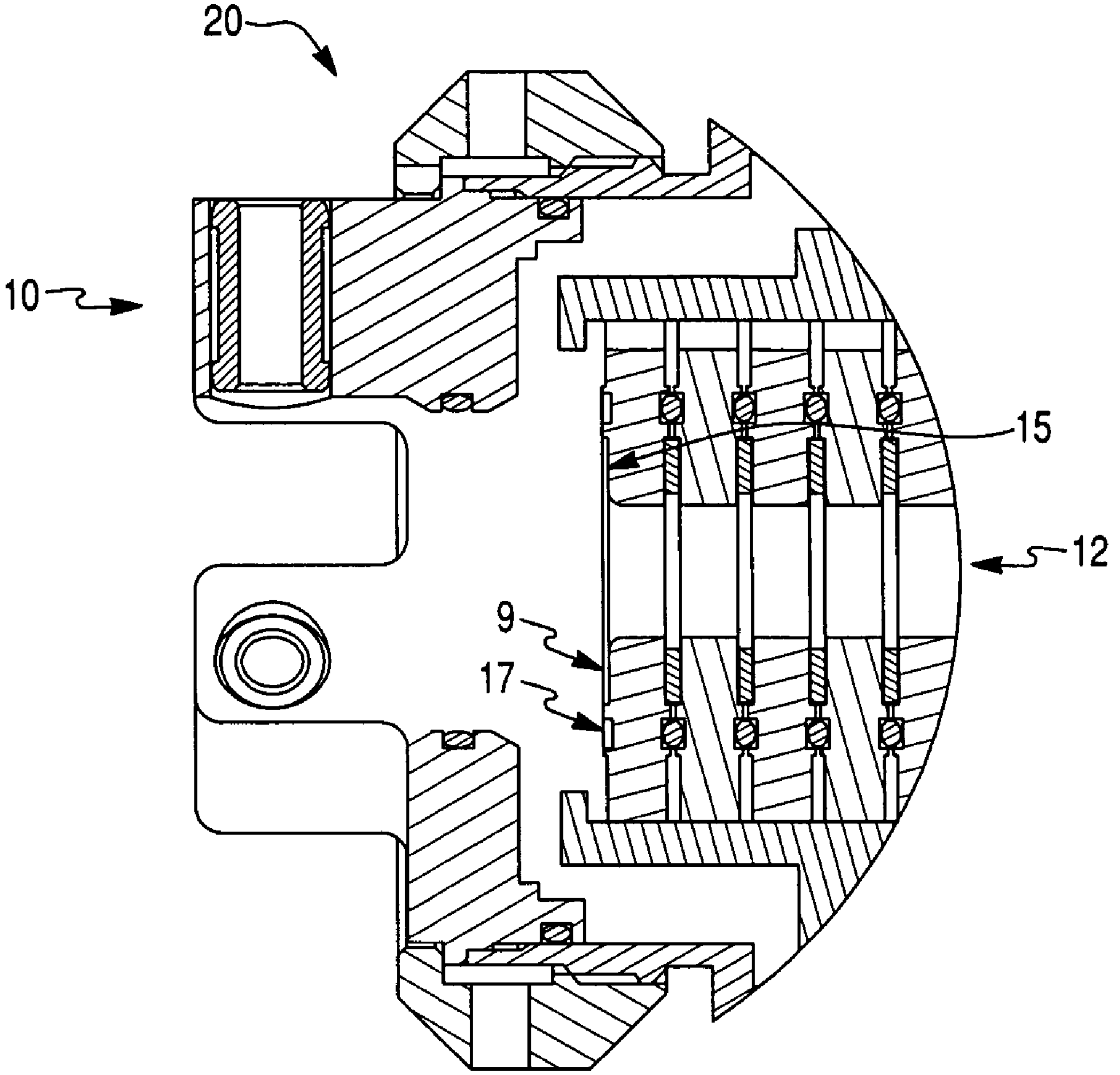
FIG. 5 is a drawing of a cross-sectional view of the plasma gun body interface in accordance with an embodiment of the invention.

Details of the receptacle area 10 of plasma gun 20 are shown in FIG. 5. The receptacle area 10 has the face 9 diameter dimensioned to receive the nozzle face 2 (not shown), that diameter being about 1.183 inches (30.05 mm). The receptacle face 9 includes counter bores 15 that are about 0.012 inches (0.3 mm) deep and have a diameter of 0.709 inches (18.0 mm) that serves as one side of a seat opposite that of the nozzle 1 (FIG. 2) for the high temperature gasket 7 (FIG. 2) to protect the seal 6 (FIG. 2) from exposure to the high temperatures associated with the plasma plume. The plasma channel 12 of the gun 20 has a bore hole of 0.275 to 0.433 inches (7-11 mm) in diameter at the center of the mating surface between the nozzle and the gun body. The receptacle face 9 contains annular grooves 17 to partially seat the o-ring 6 (FIG. 2) to seal the water channel 4 (FIG. 2). The grooves are 0.24 inches (0.6 mm) deep and have an inner diameter of 0.787 inches (20 mm) and an outer diameter of 0.945 inches (24.00 mm).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

The invention claimed is:

1. An interchangeable nozzle plug interface for a thermal spray plasma gun and an interchangeable nozzle plug, comprising:

a receptacle on said plasma gun, said receptacle fabricated at least partially from an electrically conductive material and having a face section and a first cylindrical bore extending from within said plasma gun to said face section;

a mating end section of said interchangeable nozzle plug, said interchangeable nozzle plug being fabricated from an electrically conductive material and having a distal end section and a second cylindrical bore extending from said mating end section to said distal end section;

a clamping assembly on said plasma gun for mechanically securing said mating end section to said face section; and an annular seal between said face section and said mating end section to prevent leakage of cooling liquid and/or plasma gas, wherein said mating end section of said interchangeable nozzle plug and said face section of said plasma gun are adapted to, when joined, (a) align said first cylindrical bore and said second cylindrical bore so as to form a continuous passage for plasma gas to flow from said first cylindrical bore through said second cylindrical bore, (b) form a channel for cooling liquid to flow from said plasma gun through said interchangeable nozzle plug and to a return path in said plasma gun, and (c) create an electrical contact between said plasma gun and said interchangeable nozzle plug.

2. The interface of claim 1, wherein said annular seal comprises; annular elastic seal, wherein said receptacle face section includes an annular groove suitable for securing said annular elastic seal.

3. The interface of claim 2, further comprising an annular gasket to shield said annular elastic seal from exposure to the plasma gas, said annular gasket having a smaller inner diameter than that of said annular elastic seal.

4. The interface of claim 3, further comprising at least one cooling liquid seal between said nozzle plug and said clamping assembly to prevent cooling liquid leakage.

5. The interface of claim 4, wherein cooling liquid from said plasma gun flows through said clamping assembly prior to encountering said nozzle plug.

6. The interface of claim 5, wherein the nozzle plug mating end section is about 1.177 inches in diameter and has a depth sufficient to mechanically center the nozzle plug within the receptacle.

7. The interface of claim 6, wherein the part of the receptacle face section for receiving the nozzle plug mating end section is about 1.183 inches in diameter.

8. The interface of claim 4, wherein the nozzle plug mating end section and the receptacle face section each contain grooves that are about 0.024 inches deep, said grooves having an inner diameter of about 0.787 inches and an outer diameter of about 0.945 inches to serve as a seat for said annular elastic seal.

9. The interface of claim 8, wherein said annular elastic seal has an inner diameter of about 0.801 inches and cross-section width of about 0.07 inches.

10. The interface of claim 4, wherein the nozzle plug mating end section and the receptacle face section each contain counter bores that are about 0.012 inches deep, said counter bores having an inner diameter of about 0.712 inches to serve as a seat for the annular gasket.

11. The interface of claim 10, wherein the annular gasket has an outer diameter of about 0.709 inches and a cross-section width of about 0.035 inches.

12. The interface of claim 4, wherein the first cylindrical bore and the second cylindrical bore are each about 0.275 to about 0.433 inches in diameter at the mating surface between the nozzle mating end section and the receptacle face section.

13. The interface of claim 4, wherein the clamping assembly is two-piece compression nut.

14. An interchangeable nozzle for use with a plasma gun having a nozzle plug receptacle with a face portion and a plasma outlet, said nozzle comprising:

an interchangeable nozzle plug fabricated from an electrically conductive material and having a mating end section, a distal end section, a cylindrical bore extending from said mating end section to said distal end section, said nozzle configured for forming an interface with said plasma gun wherein said mating end section and said face portion join to align said cylindrical bore and plasma outlet forming a continuous passage for plasma gas to flow from said plasma gun through said cylindrical bore, and an annular seal between said face portion and said mating end section so that, joining said mating end section and said face portion also forms a channel for cooling liquid to flow from said plasma gun through said nozzle and to a return path in said plasma gun and the annular seal prevent leakage of cooling liquid and/or plasma gas, wherein joining said mating end section and said face portion creates an electrical contact between said plasma gun and said nozzle.

15. The interchangeable nozzle of claim 14, wherein the nozzle plug is adapted for a clamping assembly on said plasma gun for mechanically securing said mating end section to said face portion.

16. The interchangeable nozzle of claim 15, wherein the mating end section is about 1.177 inches in diameter and has a depth sufficient to mechanically center the nozzle plug within the receptacle.

17. The interface of claim 15, wherein the mating end section contains a grooves about 0.024 inches deep, said grooves having an inner diameter of about 0.787 inches and an outer diameter of about 0.945 inches to serve as a seat for an annular elastic seal.

18. A method of forming an interface between a plasma gun and an interchangeable nozzle plug, comprising:

providing a plasma gun having a nozzle plug receptacle and a clamping assembly, said receptacle fabricated at least partially from an electrically conductive material, said receptacle having a face section and a first cylindrical bore extending from within said plasma gun to said face section;

providing a mating end section of said interchangeable nozzle plug, said nozzle plug being fabricated from an electrically conductive material and having a distal end section and a cylindrical bore extending from said mating end section to said distal end section;

securing said mating end section to said face portion with said clamping assembly, wherein said mating end section and said face portion join to align said cylindrical bore and plasma outlet forming a passage for plasma gas to flow, forming a channel for cooling liquid to flow from said plasma gun through said nozzle plug, and creating an electrical contact between said plasma gun and said nozzle plug; and preventing leakage of cooling liquid and/or plasma gas between said face section and said mating end section with an annular seal.

19. The method of claim 18, wherein the cooling liquid from said plasma gun flows through said clamping assembly prior to encountering said nozzle plug.

20. The method of claim 19, wherein the mating end section is about 1.177 inches in diameter and has a depth sufficient to mechanically center the nozzle plug within the receptacle.

* * * * *